United States Patent [19]

Hou et al.

[11] 4,309,247

[45] Jan. 5, 1982

[54] FILTER AND METHOD OF MAKING SAME

[75] Inventors: Kenneth C. Hou, Glastonbury; Eugene A. Ostreicher, Farmington, both of Conn.

[73] Assignee: AMF Incorporated, White Plains, N.Y.

[21] Appl. No.: 123,467

[22] Filed: Feb. 21, 1980

Related U.S. Application Data

[63] Continuation of Ser. No. 666,815, Mar. 15, 1976, abandoned.

[51] Int. Cl.³ .............................................. D21H 3/78
[52] U.S. Cl. ................................ 162/149; 162/181 R; 162/181 C; 162/187; 210/505
[58] Field of Search ............. 162/141, 164 EP, 181 R, 162/181 C, 187, 176, 149; 210/503, 504, 505

[56] References Cited

U.S. PATENT DOCUMENTS

| | | | |
|---|---|---|---|
| 2,634,207 | 4/1953 | Miscall et al. | 162/181 |
| 2,956,016 | 10/1960 | Leppla | 210/503 |
| 3,007,878 | 11/1961 | Alexander et al. | 106/286 |
| 3,034,981 | 5/1962 | Poelman et al. | 210/505 |
| 3,125,098 | 3/1964 | Osborne | 162/187 |
| 3,246,767 | 4/1966 | Pall et al. | 210/505 |
| 3,248,353 | 4/1966 | Coscia | 162/164 EP |
| 3,379,609 | 4/1968 | Roberts | 162/187 |
| 3,573,158 | 3/1971 | Pall et al. | 162/145 |
| 3,591,010 | 7/1971 | Pall | 210/505 |
| 4,007,113 | 2/1977 | Ostreicher | 210/504 |
| 4,007,114 | 2/1977 | Ostreicher | 210/504 |

OTHER PUBLICATIONS

Sonderdruck aus: "Beitrage zur Tabakforschung", Band 8, Heft 5, Mar. 1976, pp. 302-313.

Primary Examiner—William F. Smith
Attorney, Agent, or Firm—George W. Price; Michael E. Zall

[57] ABSTRACT

Filter media sheets comprising particulate retention aid consisting of cellulose pulp of +100 to −100 Canadian Standard Freeness, and method of making the same.

12 Claims, 1 Drawing Figure

CHARGE MODIFIER: MELAMINE-FORMALDEHYDE CATIONIC COLLOID
70% PARTICULATE: DICALITE 215 DIATOMACEOUS EARTH
30% UNREFINED PULP / REFINED PULP
REFINED PULP FREENESS, C. S. F. (INVERTED)

+100 ml △——△      −400 ml ○——○
−100 ml ●——●      −600 ml ×——×

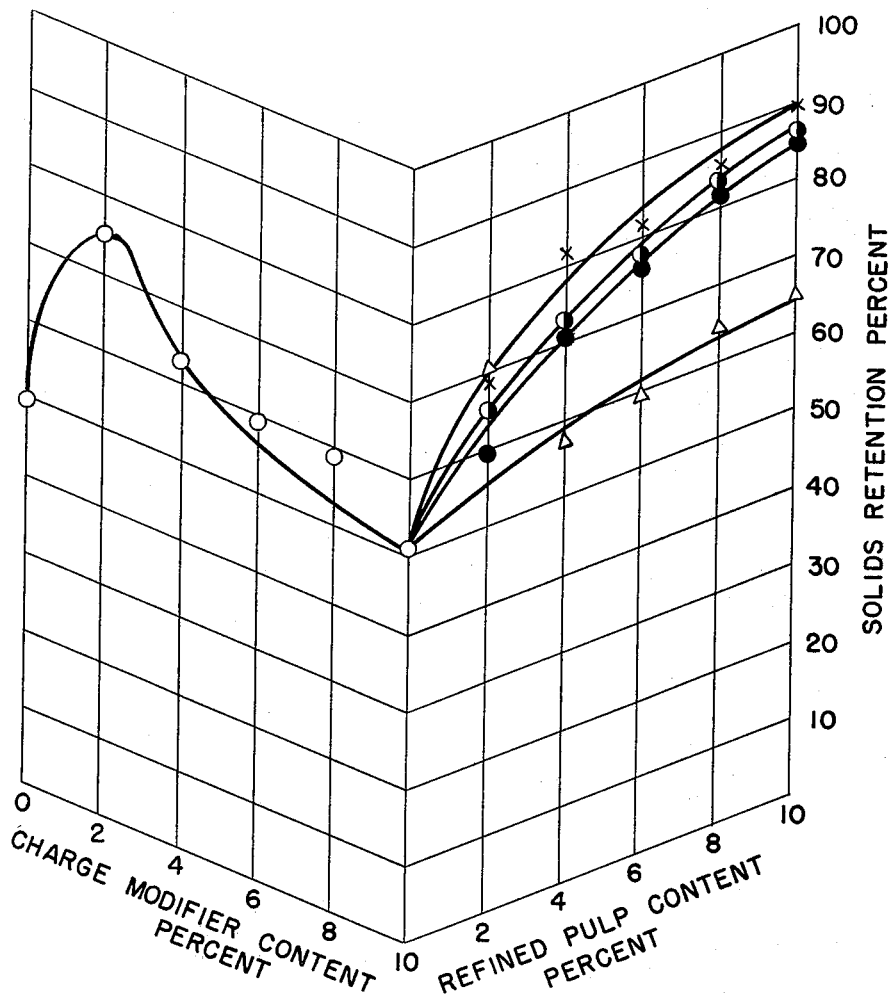
CHARGE MODIFIER: MELAMINE-FORMALDEHYDE CATIONIC COLLOID
70% PARTICULATE: DICALITE 215 DIATOMACEOUS EARTH
30% UNREFINED PULP / REFINED PULP
REFINED PULP FREENESS, C. S. F. (INVERTED)
+100 ml △——△      −400 ml ◑——◑
−100 ml ●——●      −600 ml ✕——✕

FILTER AND METHOD OF MAKING SAME

This is a continuation of application Ser. No. 666,815, filed Mar. 15, 1976.

This invention relates to filtration and, more particularly, to the removal of submicron contaminants from aqueous systems, utilizing filter media sheet comprising high levels of particulate filter aids.

The filtration of fine particle size contaminants from fluids has been accomplished by the use of various porous filter media through which the contaminated fluid is passed. To function as a filter, the media must allow the fluid, commonly water, through, while holding back the particulate contaminant. This holding back of the contaminant is accomplished by virtue of the operation, within the porous media, of one or both of two distinctly different filtration mechanisms, namely (1) mechanical straining and (2) electrokinetic particle capture. In mechanical straining, a particle is removed by physical entrapment when it attempts to pass through a pore smaller than itself. In the case of the electrokinetic capture mechanisms, the particle collides with a surface within the porous filter media and is retained on the surface by short range attractive forces.

With the exception of microporous polymeric membranes, the porous filter media known to the art as being suitable for the filtration of fine particle size contaminants are comprised of fiber-fiber or fiber-particulate mixtures formed dynamically into sheet by vacuum felting from an aqueous slurry and then subsequently drying the finished sheet. In those fibrous filter media that depend upon mechanical straining to hold back particulate contaminants, it is necessary that the pore size of the contaminant to be removed from the fluid. For removal of fine, submicronic contaminant particles by mechanical straining, the filter media need have correspondingly fine pores. Since the pore size of such a sheet is determined predominantly by the size and morphology of the materials used to form the sheet, it is necessary that one or more of the component materials be of a very small size, such as small diameter fibers. See, for example, any of Pall U.S. Pat. Nos. 3,158,532; 3,238,056; 3,246,767; 3,353,682 or 3,573,158.

As the size of the contaminants sought to be removed by filtration decreases, especially into the submicron range, the difficulty and expense of providing suitably dimensioned fiber structures for optimum filtration by mechanical straining increases. Accordingly, there is considerable interest in the use of fine particulates such as diatomaceous earth.

However, for such materials it is necessary to provide a matrix in order to present a coherent handleable structure for commerce and industry. Thus, at least one of the component materials in the sheet is a long, self-bonding structural fiber, to give the sheet sufficient structural integrity in both the wet "as formed" and in the final dried condition, to allow handling during processing and suitability for the intended end use. Cellulose fibers such as wood pulp, cotton, cellulose acetate or rayon are commonly used. These fibers are typically relatively large, with commercially available diameters in the range of six to sixty micrometers. Wood pulp, most often used because of its low relative cost, has fiber diameters ranging from fifteen to twenty-five micrometers, and fiber lengths of about 0.85 to about 6.5 mm.

Filter media sheets are conveniently formed by vacuum felting from an aqueous slurry of the component materials. The vacuum felting is performed on a foraminous surface, normally a woven wire mesh which, in practice, may vary from 50 mesh to 200 mesh, with mesh openings ranging from 280 micrometers to 70 micrometers respectively. Finer meshes are unsuitable because of clogging problems and/or structural inadequacy.

The size of the openings in the foraminous vacuum felting surface, and the pore size of the cellulose fiber matrix of the formed sheet, are quite large in comparison to some or all of the dimensions of the fine fiber or particulate components required to produce the desired submicronic filter media sheet. Retention of such fine components during the vacuum formation of the filter media sheet is difficult, and imposes severe constraints on the choice of such materials, the specific details of the process utilized to form the filter media sheet, and, most important, upon the level of filtration performance that may be attained. Fine fibers, whose length may be large in comparison to their diameter, present less of a problem and tend to be retained reasonably well. Fine particulates, on the other hand, tend to show very poor retention during sheet formation.

Flocculation with polymeric retention aids, or coagulation has been used as a means of improving retention of fine particulates, in effecting the grouping of particles to offer an effective larger dimension. However, filter sheet prepared from a well-flocculated slurry will have a broad particle size distribution, with small pores occurring inside the flocs, and large pores occurring between the flocs. The existence of these larger pores will limit the ability of the filter media sheet to remove fine contaminants. The use of flocculation to achieve high retention in filter media is therefore somewhat counterproductive.

It is, of course, possible to apply hydrodynamic shear forces, breaking up the flocs, and further charge modify until the system assumes a stable disperse form. This does achieve a relatively uniform sheet of narrow pore size distribution. However, the retention of the particulates in such a system is very low, leading to concomitant reduction of filtration efficiency.

It is accordingly an object of the present invention to provide filter media sheets of enhanced filtration performance.

It is a further object to provide a method for the removal of submicron contaminants from aqueous systems at high efficiency.

Another object is to afford a filter media sheet comprising a high level of fine particulates.

These and other objects are achieved in the practice of the present invention as described hereinafter.

GENERAL DESCRIPTION OF THE INVENTION

In accordance with the present invention, retention of fine particulates in filter media sheets is enhanced by the selective utilization in sheet formation of a minor proportion of cellulose pulp refined to a Canadian Standard Freeness of between about +100 and −1000 ml. The combination with a major proportion of normally dimensioned cellulose pulp (+400 to +800 ml.) permits the retention of fine particulates ranging in the preferred embodiments upwards of 50 percent up to 70 percent or more by weight of the sheet.

The filter media sheet, formed by vacuum felting of a cationically disperse aqueous slurry of cellulose fibers, fine particulate and highly refined wood pulp, shows a uniform, high porosity, and fine pore size structure with excellent filtration and flow characteristics.

The highly refined pulp, although known, is not commonly employed in industry and is of such fine dimension as to be expected to compound rather than solve the problem to which the invention pertains. Thus, in Example VI, a vacuum felting operation is reported for pulp of −600 ml. freeness: the resulting sheet was a thin, dense, impermeable structure on which filtration tests could not be performed.

Surprisingly, when such pulp is combined with standard cellulose pulp, in a slurry comprising particulate in the manner described, the resulting dynamically formed sheet structure achieves levels of particulate retention in the sheet not heretofore reported, with attendant benefits in filtration performance.

It will be appreciated that the high particulate retentions achieved in accordance with the invention are all the more remarkable when the total amount of cellulose pulp available to act as a matrix is considered. Thus, in the preferred embodiments, the total cellulose pulp may comprise as little as 10-20% of the total sheet weight with the refined pulp constituting as little as 1-2%.

Relatively high levels of particulate retention (up to about 45 percent by weight) have been achieved in the filtration arts, but only at the expense of an unacceptably high pressure drop due to the tight construction employed. The filter media sheets of the present invention, on the other hand, may be constructed in such manner to evidence low differential pressure drops, e.g. less than 4.0 psid, even at 70% loadings, with 7.5 percent of −400 ml. freeness pulp.

Combinations of fibers of various dimension for filters are known, as shown, for example in U.S. Pat. Nos. 2,144,781; 2,372,437; 2,708,982; or 3,034,981 and retention of ion exchange resins is shown in relation to pulp freeness in U.S. Pat. No. 2,995,067. Highly refined pulps per se are known, as described in U.S. Pat. Nos. 3,125,098 or 3,464,422.

DETAILED DESCRIPTION OF THE INVENTION

The filter media sheets of the invention are prepared from a cationically disperse aqueous slurry comprising cellulose fiber and optimized levels of fine particulate such as diatomaceous earth or perlite. The sheet is prepared dynamically by vacuum felting, and drying.

The sheet matrix comprises cellulose fibers, constituted by two discrete portions comprising species of markedly different dimensions. The major portion is composed of normal cellulose pulp, having a Canadian Standard Freeness of +400 to +800 ml. The minor portion is highly refined pulp, exhibiting a Canadian Standard Freeness of +100 to −1000 ml. The special feature of the invention is its provision of filter media sheet in which the level of particulate retained is enhanced as compared to sheet prepared conventionally. This is most readily seen in the Figure, representing a plot of refined pulp and charge modifier content against solids retention, for the systems of Example I.

The state of refinement of a wood pulp fiber is determined by means of a "freeness" test in which measurement of the flow rate through a forming pad of the fibers on a standard screen is determined. Two of the most common instruments for the measurement of freeness are the "Canadian Standard Freeness Tester" and the "Schopper-Riegler Freeness Tester". In both of these methods, the quantity which is measured is the volume of water (expressed in ml.) which overflows from a receiver containing an orifice outlet at the bottom. The Canadian Standard Freeness measurements are employed in the present specification. Coarse unbeaten wood pulp fibers produce high drainage rates into the receiver from the screen resulting in large overflow volumes, and hence record a high freeness. Typical wood pulps show Canadian Standard Freeness values ranging from +400 ml. to +800 ml. In paper or filter media manufacture, such pulps may be subject to mechanical refining processes such as beating, which tends to cut and/or fibrillate the cellulose fibers. Such beaten fibers exhibit slower drainage rates, and, therefore, lower freeness. The most highly refined pulp used in the paper industry are the so-called glassine pulps, which have been subjected to extended beating and exhibit Canadian Standard Freeness values of +80 to +100 ml. Paper made from a glassine pulp is a thin, hard, almost transparent paper which is essentially impermeable to fluid flow.

If refining is continued beyond the glassine pulp (CSF +100) condition, a point is reached where the measured freeness begins to increase with time. In this range of freeness, fiber fines are noted in the overflow stream and it is evident that some of the solid matter is coming through the screen rather than forming a mat on it. As refining is continued, the quantity of fines in the overflow increases as more and more of the material passes through the screen. The freeness in this range is described as "inverted" and, for convenience, is given a negative value (e.g. −200 ml.) By use of special refining equipment and long refining time, it is possible to achieve Inverted Canadian Freeness values up to −1000 ml.

In order to achieve significant increases in retention of fine particulates during vacuum felting of the filter media sheet, only small amounts of the highly refined pulp need be added to the fiber-particulate slurry. As little as one percent by weight of the total refined pulp produces significant increases in retention. The more highly refined the pulp is, the smaller the amount that is required to achieve a given level of improvement in retention. Diminishing increments of improvement in retention are noted as the amount of refined pulp is increased and the degree of refining is extended into higher inverted Canadian Freeness values. In practice, there appears to be little advantage in using more than 10 percent, by weight, of the highly refined pulp, or of using refined pulps exhibiting inverted Canadian Freeness values greater than −600 ml.

There are several types of pulp refiners comercially available and these fall into two basic categories, namely, conical or jordan types, and disc types. The disc types, especially double-disc refiners, appear to be particularly suitable for the preparation of highly refined pulps.

The standard grade of wood pulp (hereinafter "unrefined") may comprise as little as 10 percent by weight with up to 20 to 30 percent, by weight of the total, being preferred to provide filter media sheet with structural characteristics suitable for industrial filtration applications. Generally, the weight ratio of unrefined to highly refined pulp will range from about 2:1 to 10:1, preferably 3:1 to 5:1.

Performance is enhanced by maximizing the amount of fine particulate in the filter media sheet. While as little as 10 percent of a fine particulate will result in noticeable improvement in filtration performance of either type of media, optimum performance is achieved by utilizing the maximum amount of fine particulate consistent with the aforementioned requirements for certain amounts of unrefined and refined wood pulp. For industrial filtration, structural characteristics suggest a practicable maximum of about 70 percent by weight. Of course, for less demanding applications, somewhat higher levels will be possible. Generally, levels of 50–70 percent by weight are employed.

There are various types of fine particulates that are suitable for the intended purpose, including diatomaceous earth, magnesia, perlite, talc, collodial silica, polymeric particulates such as those produced by emulsion or suspension polymerization, e.g. polystyrene, polyacrylates, poly(vinyl acetate), polyethylene, (or other such materials as described in Emulsions and Emulsion Technology, Lissant, Kenneth J., Narcel Dekker, 1974) activated carbon, molecular sieves clay etc. Functionally, the fine particulate should have a specific surface area in excess of one square meter/gram and/or particle diameters of less than 10 microns. In a broad sense, any fine particulate may be suitable (such as J.N. Filter Cel, Standard Super Cel, Celite 512, Hydro Super Cel, Speed Plus and Speedflow; Dicalite 215 and Dicalite 416 and Dicalite 436) and may be evaluated by techniques well-known to the art. From the standpoint of size, morphology, cost, fluid compatibility and general performance characteristics, the finer grades of diatomaceous earth and perlite filter aids exhibiting a mean particle size of less than 5 microns are preferred. In many cases, mixtures of more than one type of fine particulate such as diatomaceous earth/perlite for example, in proportion by weight of from about 80/20 to 20/80 give better filtration performance or better cost/performance characteristics than that achieved by the use of any single type by itself. Preferably, diatomaceous earth comprises at least 50 weight percent of the particulate content. Similarly, mixtures in all proportions of relatively coarse and fine particulates, e.g. 50/50 parts by weight of 10 and 5 micron diameter particulates may be used.

In addition to controlling the dispersion characteristics (and therefore the porosity of the sheet) charge modifiers are employed to control the zeta potential of the sheet consituents and maximize performance in the electrokinetic capture of small charged contaminants. In practice, cationic charge modifiers are employed since most naturally occurring contaminant surfaces are anionic at fluid pH of practical interest. Such charge modifiers may be cationic polyelectrolytes, including such functional groups as protonated amines, quaternary ammonium, phosphonium or sulfonium (for a general survey, see M. F. Hoover "Cationic Quaternary Polyelectrolytes—A Literature Review" *J. Macromol. Sci. Chem.* 4, #6, pp. 1327–1417 (1970)), cationic inorganics, such as a cationic silica colloid, or finely divided alumina, or, in general, organic or inorganic ionic polymers. Melamine formaldehyde colloids such as those disclosed in copending and commonly assigned Application Ser. No. 598,097, filed July 22, 1975 as a continuation-in-part of Ser. No. 358,822, filed May 9, 1973, incorporated herein by reference, may be preferred in some cases.

The specific choice of charge modifying agent depends upon many factors, including cost, fluid and temperature compatibility, toxicology and supplementary functional attributes such as cross-linking characteristics with cellulose and siliceous surfaces, in addition to the primary filtration performance factors. Selection of suitable charge modifying agents, from the broad categories specified above, may be easily accomplished by methods well-known to the art.

In paper production, where cationic charge modifiers are sometimes used, the objective is reduction of charge to approximately the isoelectric point to maximize efficiency in interfelting of fiber. For filtration, maximum charge is desired to enhance removal of charged particles by electrokinetic mechanisms. In the present case the surface charge of the negatively charged cellulose is reversed by the deposition of sufficient cationic charge modifier to render the surface electropositive. In order to accomplish charge reversal, of course, one proceeds through the isoelectric point, and then positive charge buildup is accomplished to the maximum practical level.

The amount of charge modifier employed in the present invention is that sufficient to at least provide a cationically disperse system i.e., a system in which no visible flocculation occurs at ambient conditions in the absence of applied hydrodynamic shear forces. The system therefore comprises essentially discrete fiber elements exhibiting a positive charge or zeta potential relatively uniformly or homogeneously distributed in and throughout the aqueous medium. The specific level will, of course, vary with the system and the modifier selected but will be readily determined by one skilled in the art. For example, the inflection point on a plot of particulate retention vs. amount of charge modifier approximates the minimum level for better performance. Thus, for a melamine formaldehyde colloid a 7 percent level, based upon the weight of total pulp and particulate is found to be suitable; whereas a 2 percent level is appropriate for a polyamideepichlorhydrin resin. In the case of a cationic silica colloid, 14 percent gives best results. Although additional modifier may be employed to advantage where desired, these levels represent the best balance for these materials on a cost/performance basis.

The slurry of pulp and particulates is formed in any suitable manner. The sequence of adding these components to water to form the initial slurry appears to be relatively unimportant. The consistency of the slurry will represent the highest possible for a practical suspension of the components, usually about 4 percent. The system is subjected to hydrodynamic shear forces as by a bladed mixer, and the charge modifier is then added to the slurry.

The shear level is not critical i.e. any otherwise suitable shear rate or shear stress may be employed having regard for available equipment, preferred processing times etc. but is selected and employed simply to break up the flocs and maintain the system in a dispersed condition during treatment. Of course, upon the formation of a cationically disperse slurry, the system is free of floc formation even in the absence of applied shear. The pulp and particulates or each may of course be pretreated with the charge modifier.

After charge modification, the slurry is diluted with additional water to the proper consistency required for vacuum felting sheet formation, ordinarily 1 to 2½ percent, depending upon the type of equipment used to form the sheet, in a manner known to the artisan. The slurry is cast into a sheet and air dried in standard manner. The method of drying is not critical, although faster drying sequences are preferred hence elevated temperatures up to the decomposition or scorch point for the system are employed.

The filter media sheets may be subjected to standardized testing reflecting performance in use, represented herein by the following:

Membrane Protection Test

In this test, contaminated fluid is pumped under standard conditions through test filter media and a membrane in series at a constant flow rate, and differential pressure with time recorded. The time or total volume of flow passed at a defined pressure increase is a measure of the life of the prefilter, and interrelates satisfactorily with performance in use. Typically, a 47 mm. 0.22 micron membrane is employed at a flow rate of 225 ml./min. Test contaminant is Hyplar (produced by Grumbacher) a polydisperse acrylic latex produced by emulsion polymerization and comprising colloidal polymer particles ranging from 0.05 to 1.0 micron. Contaminant level is 50 FTU (Hach Turbidimeter, Model 2100A). The test is continued until the differential pressure across either the membrane or the test filter pad exceeds 10 psid. Membrane protection times of less than a few minutes indicates no practically useful effect.

Oil Flow Test

As a measure of the porosity of the filter media sheets, 100 ssu oil is pumped through the sample sheet until a differential pressure drop of 5 psid is attained, at which point the flow rate (ml./min.) is recorded.

In the following examples which further illustrate this invention; proportions are by weight, based upon total pulp and particulate, excluding charge modifier.

EXAMPLE I

A. A series of filter sheets were prepared utilizing Weyerhauser Coho Kraft as the unrefined pulp, of (+700 ml. C.S.F., mean diameter about 20 microns and mean length about 1/16"), Grefco Dicalite 215 diatomaceous earth (calcined, mean particle size about 2.7 microns) as the particulate, and Domtar Pulp Ltd., Dolbeau unbleached sulfite pulp as the base pulp for refining. The latter was refined to the levels indicated below using a Black Clawson Twin Disc Refiner. The charge modifier employed in these runs was cationic melamine formaldehyde acid colloid (American Cyanamid Parez 607, prepared from a 0.7 acid ratio mixture with HCl at 12 percent resin solids, aged for two hours to allow colloid formation, then diluted to 6 percent solids to terminate reaction).

In order to evaluate the effect of the addition of charge modifier with no refined pulp, the first portion of the series utilized a constant proportion of unrefined pulp (30 percent by weight, or 24 grams) and particulate (70 percent by weight or 56 grams) with amounts of charge modifier between 0 and 7 percent, by weight, of total pulp and particulate weight.

In order to evaluate the effect of varying additions of the various freeness levels of refined pulp at constant charge modifier level, the second portion of the series was run with the charge modifier at the 7 percent, by weight, level and the particulate at 70 percent by weight. The total unrefined plus refined pulp content was maintained at 30 percent by weight, with varying amounts of each of the four refined pulps being utilized. In the third series, the charge modifier level was reduced, to 1.4 percent.

In all cases, the total input weight (bone dry basis) of the component materials was 80 grams, exclusive of charge modifier. The components were added to water in a 1 liter polyethylene bucket, with strong agitation, to form an aqueous slurry at four percent consistency, and the charge modifier added. (The system was subjected to hydrodynamic shear by action of a Hei-Dolph stirrer (Polyscience Inc.), having 4 propeller blades, rotating at about 700 rpm on setting 2.) The slurry was subsequently diluted to two percent consistency and vacuum felted into a sheet ranging from about 0.160 to 0.200 inch thickness (depending upon retention) in a nine inch by twelve inch hand sheet apparatus utilizing a 100 mesh screen. The sheet was subsequently removed, dried in a static oven at 350° F. until constant weight was achieved, and the final weight recorded. Comparison of the final sheet weight with the total input material weight allowed determination of total solids retention in sheet. Results are set forth in Table I and shown in FIG. 1.

TABLE I

| Sheet No. | UNREFINED WOOD PULP (+700 C.S.F.) Weight Percent | PARTICULATE (2i5 D.E.) Weight Percent | CHARGE MODIFIER (607 M.F. COLLOID) Weight Percent | REFINED WOOD PULP Type (C.S.F.) | REFINED WOOD PULP Weight Percent | CALC. TOTAL Weight (Grams) | ACTUAL SHEET Weight (Grams) | SOLIDS RETENTION Percent |
|---|---|---|---|---|---|---|---|---|
| 1 | 30 | 70 | 0 | | 0 | 80 | 39.8 | 49.8 |
| 2 | 30 | 70 | 1.4 | | 0 | 81.12 | 52.6 | 64.8 |
| 3 | 30 | 70 | 2.8 | | 0 | 82.24 | 43.0 | 52.3 |
| 4 | 30 | 70 | 4.2 | | 0 | 83.36 | 41.0 | 49.2 |
| 5 | 30 | 70 | 5.6 | | 0 | 84.48 | 40.9 | 48.4 |
| 6 | 30 | 70 | 7.0 | | 0 | 85.60 | 34.4 | 40.2 |
| 7 | 28 | 70 | 7.0 | +100 | 2 | 85.60 | 60.1 | 70.2 |
| 8 | 26 | 70 | 7.0 | +100 | 4 | 85.60 | 49.0 | 57.2 |
| 9 | 24 | 70 | 7.0 | +100 | 6 | 85.60 | 51.1 | 59.7 |
| 10 | 22 | 70 | 7.0 | +100 | 8 | 85.60 | 54.9 | 64.1 |
| 11 | 20 | 70 | 7.0 | +100 | 10 | 85.60 | 55.1 | 64.4 |
| 12 | 28 | 70 | 7.0 | −100 | 2 | 85.60 | 51.3 | 59.9 |
| 13 | 26 | 70 | 7.0 | −100 | 4 | 85.60 | 60.4 | 70.6 |
| 14 | 24 | 70 | 7.0 | −100 | 6 | 85.60 | 65.4 | 76.4 |
| 15 | 22 | 70 | 7.0 | −100 | 8 | 85.60 | 69.9 | 81.7 |
| 16 | 20 | 70 | 7.0 | −100 | 10 | 85.60 | 71.2 | 83.2 |
| 17 | 28 | 70 | 7.0 | −400 | 2 | 85.60 | 55.8 | 65.2 |
| 18 | 26 | 70 | 7.0 | −400 | 4 | 85.60 | 62.1 | 72.5 |
| 19 | 24 | 70 | 7.0 | −400 | 6 | 85.60 | 66.5 | 77.7 |
| 20 | 22 | 70 | 7.0 | −400 | 8 | 85.60 | 71.1 | 83.1 |
| 21 | 20 | 70 | 7.0 | −400 | 10 | 85.60 | 73.5 | 85.9 |
| 22 | 28 | 70 | 7.0 | −600 | 2 | 85.60 | 59.4 | 69.4 |
| 23 | 26 | 70 | 7.0 | −600 | 4 | 85.60 | 70.0 | 81.2 |

TABLE I-continued

| Sheet No. | UNREFINED WOOD PULP (+700 C.S.F.) Weight Percent | PARTICULATE (2i5 D.E.) Weight Percent | CHARGE MODIFIER (607 M.F. COLLOID) Weight Percent | REFINED WOOD PULP Type (C.S.F.) | REFINED WOOD PULP Weight Percent | CALC. TOTAL Weight (Grams) | ACTUAL SHEET Weight (Grams) | SOLIDS RETENTION Percent |
|---|---|---|---|---|---|---|---|---|
| 24 | 24 | 70 | 7.0 | −600 | 6 | 85.60 | 69.5 | 81.2 |
| 25 | 22 | 70 | 7.0 | −600 | 8 | 85.60 | 73.3 | 85.6 |
| 26 | 20 | 70 | 7.0 | −600 | 10 | 85.60 | 76.2 | 89.0 |
| 27 | 28 | 70 | 1.4 | +100 | 2 | 81.12 | 53.0 | 65.3 |
| 28 | 26 | 70 | 1.4 | +100 | 4 | 81.12 | 62.9 | 77.5 |
| 29 | 24 | 70 | 1.4 | +100 | 6 | 81.12 | 65.8 | 81.1 |
| 30 | 22 | 70 | 1.4 | +100 | 8 | 81.12 | 72.0 | 88.8 |
| 31 | 20 | 70 | 1.4 | +100 | 10 | 81.12 | 71.5 | 88.2 |
| 32 | 28 | 70 | 1.4 | −600 | 2 | 81.12 | 65.5 | 80.7 |
| 33 | 26 | 70 | 1.4 | −600 | 4 | 81.12 | 72.2 | 89.0 |
| 34 | 24 | 70 | 1.4 | −600 | 6 | 81.12 | 75.2 | 92.7 |
| 35 | 22 | 70 | 1.4 | −600 | 8 | 81.12 | 73.0 | 90.0 |
| 36 | 20 | 70 | 1.4 | −600 | 10 | 81.12 | 75.5 | 93.1 |

These sheets were tested for membrane protection in filtration, in accordance with the standard test set forth above. Results were as follows:

TABLE 2

| % Part. | Sheet Number | Percent Charge Modifier | Membrane Protection (Minutes) | Differential Pressure Drop Increase (psid) Across Filter Media | Differential Pressure Drop Increase (psid) Across Membrane |
|---|---|---|---|---|---|
| 0 | 2 | 1.4 | 16.0 | 0 | 10.0 |
| 0 | 6 | 7.0 | 7.5 | 0 | 10.0 |
| 10 | 26 | 7.0 | 42.0 | 10.0 | 0.3 |
| 10 | 31 | 1.4 | 4.0 | 0.7 | 10.7 |
| 10 | 36 | 1.4 | 9.0 | 0 | 10.2 |

Analyzing the results, it will be observed that, in the absence of the refined pulp, solids retention passed through a maximum at 1.4 percent by weight of unrefined pulp and particulates (Sample No. 2), reflecting flocculation effects. However, in filter testing, the membrane clogged after only a limited time hence virtually no protection was offered by the filter sheet, (No. 2), and even when a higher proportion of charge modifier was employed (No. 6) the more disperse system did not retain sufficient particulate for good filtration. However, with the refined pulp (−600 ml) incorporated at a level of 10 percent by weight of pulp and particulate, membrane protection was excellent at 42 minutes, and failure was by filter clogging (No. 26).

These results are further borne out by standard oil flow testing, wherein sheet No. 26 exhibits a controlled flow rate of 3.5 ml./min. derivative from a tighter pore structure whereas sheets 2 and 6 evidence high flow, at 166 and 580 ml/min. respectively.

Utilizing the lower level of charge modifier (1.4 percent) it will be seen that solids retention is excellent, but membrane protection failures occur quickly by membrane clogging establishing the preference for the higher levels of charge modification (Samples 31 and 36).

EXAMPLE II

A series of filter sheets were prepared and total solids retention determined in the manner described in Example I, except that the particulate used was Grefco Dicalite 416 Perlite, having a mean particle size of 3.9 microns. The data related to solids retention of this series is given in Table 3.

TABLE 3

| Sheet No. | UNREFINED WOOD PULP (+700 C.S.F.) Weight Percent | PARTICULATE (416 PERLITE) Weight Percent | CHARGE MODIFIER (607 M.F. COLLOID) Weight Percent | REFINED WOOD PULP Type (C.S.F.) | REFINED WOOD PULP Weight Percent | CALC. TOTAL Weight (Grams) | ACTUAL SHEET Weight (Grams) | SOLIDS RETENTION Percent |
|---|---|---|---|---|---|---|---|---|
| 37 | 30 | 70 | 0 | | 0 | 80.00 | 64.0 | 80.0 |
| 38 | 30 | 70 | 1.4 | | 0 | 81.12 | 58.0 | 72.4 |
| 39 | 30 | 70 | 2.8 | | 0 | 82.24 | 54.9 | 66.8 |
| 40 | 30 | 70 | 4.2 | | 0 | 83.36 | 52.6 | 63.1 |
| 41 | 30 | 70 | 5.6 | | 0 | 84.48 | 60.6 | 71.7 |
| 42 | 30 | 70 | 7.0 | | 0 | 85.60 | 62.2 | 72.7 |
| 43 | 28 | 70 | 7.0 | +100 | 2 | 85.60 | 57.6 | 67.3 |
| 44 | 26 | 70 | 7.0 | +100 | 4 | 85.60 | 58.2 | 68.0 |
| 45 | 24 | 70 | 7.0 | +100 | 6 | 85.60 | 59.3 | 69.3 |
| 46 | 22 | 70 | 7.0 | +100 | 8 | 85.60 | 60.3 | 70.4 |
| 47 | 20 | 70 | 7.0 | +100 | 10 | 85.60 | 62.3 | 72.8 |
| 48 | 28 | 70 | 7.0 | −100 | 2 | 85.60 | 60.0 | 70.1 |
| 49 | 26 | 70 | 7.0 | −100 | 4 | 85.60 | 66.4 | 77.6 |
| 50 | 24 | 70 | 7.0 | −100 | 6 | 85.60 | 68.3 | 79.8 |
| 51 | 22 | 70 | 7.0 | −100 | 8 | 85.60 | 72.9 | 85.2 |
| 52 | 20 | 70 | 7.0 | −100 | 10 | 85.60 | 73.5 | 85.9 |
| 53 | 28 | 70 | 7.0 | −400 | 2 | 85.60 | 61.4 | 71.7 |
| 54 | 26 | 70 | 7.0 | −400 | 4 | 85.60 | 66.9 | 78.2 |
| 55 | 24 | 70 | 7.0 | −400 | 6 | 85.60 | 69.4 | 81.1 |
| 56 | 22 | 70 | 7.0 | −400 | 8 | 85.60 | 71.5 | 83.5 |
| 57 | 20 | 70 | 7.0 | −400 | 10 | 85.60 | 73.4 | 85.7 |
| 58 | 28 | 70 | 7.0 | −600 | 2 | 85.60 | 66.3 | 77.5 |
| 59 | 26 | 70 | 7.0 | −600 | 4 | 85.60 | 69.1 | 80.7 |
| 60 | 24 | 70 | 7.0 | −600 | 6 | 85.60 | 71.1 | 83.1 |

TABLE 3-continued

| Sheet No. | UNREFINED WOOD PULP (+700 C.S.F.) Weight Percent | PARTICULATE (416 PERLITE) Weight Percent | CHARGE MODIFIER (607 M.F. COLLOID) Weight Percent | REFINED WOOD PULP Type (C.S.F.) | REFINED WOOD PULP Weight Percent | CALC. TOTAL Weight (Grams) | ACTUAL SHEET Weight (Grams) | SOLIDS RETENTION Percent |
|---|---|---|---|---|---|---|---|---|
| 61 | 22 | 70 | 7.0 | −600 | 8 | 85.60 | 76.1 | 88.9 |
| 62 | 20 | 70 | 7.0 | −600 | 10 | 85.60 | 77.0 | 90.0 |

In the manner described in Example 1, selected sheet samples were subjected to filtration and oil flow tests. The results were as follows:

TABLE 4

| Sheet Number | Membrane Protection (minutes) | Differential Pressure Drop Increase (psid) Across Filter Media | Differential Pressure Drop Increase (psid) Across Membrane | Oil Flow |
|---|---|---|---|---|
| 38 | 30.0 | 0 | 10.0 | 105 |
| 42 | 40.0 | 0 | 10.0 | 66 |
| 62 | 74.0 | 10.0 | 1.1 | 5.5 |

EXAMPLE III

A series of filter sheets were prepared and total solids retention determined in the manner described in Example 1, except that the particulate was a 50/50 blend of Grefco Dicalite 416 Perlite and Dicalite 215 Diatomaceous Earth. The data related to solids retention of this series is given in Table 5, as follows.

TABLE 6

| Sheet Number | Membrane Protection (Minutes) | Differential Pressure Drop Increase (psid) Across Filter Media | Differential Pressure Drop Increase (psid) Across Membrane | Oil Flow |
|---|---|---|---|---|
| 64 | 52.0 | 0.1 | 10.0 | 72 |
| 68 | 53.0 | 0.1 | 10.0 | 144 |
| 88 | 77.5 | 10.0 | 1.6 | 7.5 |

EXAMPLE IV

A series of filter sheets were prepared and total solids retention determined in the manner described in Example 1, except that the charge modifier was the high molecular weight cationic polyamide-epichlorohydrin resin Hercules Polycup 1884, (see U.S. Pat. Nos. 2,926,154 and 2,926,116) diluted to 2% solids, which was utilized at levels of 0, 0.25, 0.50, 0.75, 1.00, 1.25, 1.50, 1.75 and 2.00 percent based upon total pulp and particulate in the first portion of the test series, and maintained at the 2.0 percent level for the second portion of the test series. The data related to the solids retention of this series is given in Table 7, as follows:

TABLE 5

| Sheet No. | UNREFINED WOOD PULP (+700 C.S.F.) Weight Percent | PARTICULATE (50/50 215 D.E./ 416 PERLITE) Weight Percent | CHARGE MODIFIER (607 M.F. COLLOID) Weight Percent | REFINED WOOD PULP Type (C.S.F.) | REFINED WOOD PULP Weight Percent | CALC. TOTAL Weight (Grams) | ACTUAL SHEET Weight (Grams) | SOLIDS RETENTION Percent |
|---|---|---|---|---|---|---|---|---|
| 63 | 30 | 70 | 0 |  | 0 | 80.00 | 61.1 | 76.1 |
| 64 | 30 | 70 | 1.4 |  | 0 | 81.12 | 62.6 | 77.2 |
| 65 | 30 | 70 | 2.8 |  | 0 | 88.24 | 52.8 | 64.2 |
| 66 | 30 | 70 | 4.2 |  | 0 | 88.36 | 54.2 | 65.0 |
| 67 | 30 | 70 | 5.6 |  | 0 | 84.48 | 53.2 | 63.0 |
| 68 | 30 | 70 | 7.0 |  | 0 | 85.60 | 54.1 | 63.2 |
| 69 | 28 | 70 | 7.0 | +100 | 2 | 85.60 | 51.3 | 59.9 |
| 70 | 26 | 70 | 7.0 | +100 | 4 | 85.60 | 54.1 | 63.2 |
| 71 | 24 | 70 | 7.0 | +100 | 6 | 85.60 | 62.6 | 73.1 |
| 72 | 22 | 70 | 7.0 | +100 | 8 | 85.60 | 62.5 | 73.0 |
| 73 | 20 | 70 | 7.0 | +100 | 10 | 85.60 | 70.7 | 82.6 |
| 74 | 28 | 70 | 7.0 | −100 | 2 | 85.60 | 56.8 | 66.4 |
| 75 | 26 | 70 | 7.0 | −100 | 4 | 85.60 | 64.9 | 75.8 |
| 76 | 24 | 70 | 7.0 | −100 | 6 | 85.60 | 68.5 | 80.0 |
| 77 | 22 | 70 | 7.0 | −100 | 8 | 85.60 | 70.1 | 81.9 |
| 78 | 20 | 70 | 7.0 | −100 | 10 | 85.60 | 71.9 | 84.0 |
| 79 | 28 | 70 | 7.0 | −400 | 2 | 85.60 | 59.2 | 69.1 |
| 80 | 26 | 70 | 7.0 | −400 | 4 | 85.60 | 64.0 | 74.8 |
| 81 | 24 | 70 | 7.0 | −400 | 6 | 85.60 | 71.7 | 83.8 |
| 82 | 22 | 70 | 7.0 | −400 | 8 | 85.60 | 72.0 | 84.1 |
| 83 | 20 | 70 | 7.0 | −400 | 10 | 85.60 | 73.2 | 85.5 |
| 84 | 28 | 70 | 7.0 | −600 | 2 | 85.60 | 61.5 | 71.8 |
| 85 | 26 | 70 | 7.0 | −600 | 4 | 85.60 | 69.5 | 81.2 |
| 86 | 24 | 70 | 7.0 | −600 | 6 | 85.60 | 71.2 | 83.2 |
| 87 | 22 | 70 | 7.0 | −600 | 8 | 85.60 | 75.5 | 88.2 |
| 88 | 20 | 70 | 7.0 | −600 | 10 | 85.60 | 75.4 | 88.1 |

In the manner described in Example 1, selected sheet samples were subjected to filtration and oil flow tests, with the following results:

TABLE 7

| Sheet No. | UNREFINED WOOD PULP (+700 C.S.F.) Weight Percent | PARTICULATE (215 D.E.) Weight Percent | CHARGE MODIFIER (POLYCUP 1884) Weight Percent | REFINED WOOD PULP Type (C.S.F.) | REFINED WOOD PULP Weight Percent | CALC. TOTAL Weight (Grams) | ACTUAL SHEET Weight (Grams) | SOLIDS RETENTION Percent |
|---|---|---|---|---|---|---|---|---|
| 89 | 30 | 70 | 0 | | | 80.0 | 41.4 | 51.8 |
| 90 | 30 | 70 | .25 | | | 80.2 | 58.4 | 72.7 |
| 91 | 30 | 70 | .50 | | | 80.4 | 61.4 | 76.4 |
| 92 | 30 | 70 | .75 | | | 80.6 | 67.3 | 83.5 |
| 93 | 30 | 70 | 1.00 | | | 80.8 | 59.0 | 73.0 |
| 94 | 30 | 70 | 1.25 | | | 81.0 | 53.3 | 65.8 |
| 95 | 30 | 70 | 1.50 | | | 81.2 | 42.6 | 52.5 |
| 96 | 30 | 70 | 1.75 | | | 81.4 | 42.1 | 51.7 |
| 97 | 30 | 70 | 2.00 | | | 81.6 | 40.5 | 49.3 |
| 98 | 28 | 70 | 2.00 | +100 | 2 | 81.6 | 53.8 | 65.0 |
| 99 | 26 | 70 | 2.00 | +100 | 4 | 81.6 | 59.3 | 72.7 |
| 100 | 24 | 70 | 2.00 | +100 | 6 | 81.6 | 60.1 | 73.7 |
| 101 | 22 | 70 | 2.00 | +100 | 8 | 81.6 | 63.8 | 78.2 |
| 102 | 20 | 70 | 2.00 | +100 | 10 | 81.6 | 65.3 | 80.0 |
| 103 | 28 | 70 | 2.00 | −100 | 2 | 81.6 | 59.2 | 72.5 |
| 104 | 26 | 70 | 2.00 | −100 | 4 | 81.6 | 64.8 | 79.4 |
| 105 | 24 | 70 | 2.00 | −100 | 6 | 81.6 | 68.5 | 84.0 |
| 106 | 22 | 70 | 2.00 | −100 | 8 | 81.6 | 72.3 | 88.6 |
| 107 | 20 | 70 | 2.00 | −100 | 10 | 81.6 | 74.5 | 91.3 |
| 108 | 28 | 70 | 2.00 | −400 | 2 | 81.6 | 58.6 | 71.8 |
| 109 | 26 | 70 | 2.00 | −400 | 4 | 81.6 | 64.8 | 79.4 |
| 110 | 24 | 70 | 2.00 | −400 | 6 | 81.6 | 72.5 | 88.8 |
| 111 | 22 | 70 | 2.00 | −400 | 8 | 81.6 | 75.6 | 92.6 |
| 112 | 20 | 70 | 2.00 | −400 | 10 | 81.6 | 74.7 | 91.5 |
| 113 | 28 | 70 | 2.00 | −600 | 2 | 81.6 | 63.6 | 77.4 |
| 114 | 26 | 70 | 2.00 | −600 | 4 | 81.6 | 69.6 | 85.3 |
| 115 | 24 | 70 | 2.00 | −600 | 6 | 81.6 | 72.8 | 89.2 |
| 116 | 22 | 70 | 2.00 | −600 | 8 | 81.6 | 77.3 | 94.7 |
| 117 | 20 | 70 | 2.00 | −600 | 10 | 81.6 | 78.3 | 96.6 |

In the manner described in Example 1, selected sheet samples were subjected to filtration and oil flow tests, with the following results:

TABLE 8

| Sheet Number | Membrane Protection (Minutes) | Differential Pressure Drop Increase (psid) Across Filter Media | Differential Pressure Drop Increase (psid) Across Membrane | Oil Flow |
|---|---|---|---|---|
| 92 | 39.0 | 0.2 | 10.0 | 68 |
| 97 | 6.0 | 0 | 10.0 | 383 |
| 117 | 8.7 | 10.0 | 0.3 | 9.0 |

EXAMPLE V

A series of sample filter sheets were prepared and total solids retention determined in the manner described in Example 1, except that the charge modifier was the cationic inorganic silica colloid Dupont 130-M (see U.S. Pat. No. 3,007,878), which was utilized at levels of 0, 2.8, 5.6, 8.4, 12.5, and 14 percent (based upon the total weight of pulp and particulate) in the first portion of the test series, and maintained at the 14 percent level for the second portion of the test series. The data related to the solids retention of this series is given in Table 9, as follows:

TABLE 9

| Sheet No. | UNREFINED WOOD PULP (+700 C.S.F.) Weight Percent | PARTICULATE (215 D.E.) Weight Percent | CHARGE MODIFIER (130-M SILICA COLLOID) Weight Percent | REFINED WOOD PULP Type (C.S.F.) | REFINED WOOD PULP Weight Percent | CALC. TOTAL Weight (Grams) | ACTUAL SHEET Weight (Grams) | SOLIDS RETENTION Percent |
|---|---|---|---|---|---|---|---|---|
| 118 | 30 | 70 | 0 | | 0 | 80.00 | 66.2 | 82.8 |
| 119 | 30 | 70 | 2.8 | | 0 | 82.24 | 63.6 | 77.3 |
| 120 | 30 | 70 | 5.6 | | 0 | 84.48 | 53.9 | 63.8 |
| 121 | 30 | 70 | 8.4 | | 0 | 86.72 | 47.6 | 54.9 |
| 122 | 30 | 70 | 12.5 | | 0 | 89.96 | 44.9 | 49.9 |
| 123 | 30 | 70 | 14.0 | | 0 | 91.20 | 43.8 | 48.0 |
| 124 | 28 | 70 | 14.0 | +100 | 2 | 91.20 | 54.2 | 59.4 |
| 125 | 26 | 70 | 14.0 | +100 | 4 | 91.20 | 62.0 | 68.0 |
| 126 | 24 | 70 | 14.0 | +100 | 6 | 91.20 | 68.7 | 75.3 |
| 127 | 22 | 70 | 14.0 | +100 | 8 | 91.20 | 68.3 | 74.9 |
| 128 | 20 | 70 | 14.0 | +100 | 10 | 91.20 | 71.1 | 78.0 |
| 129 | 28 | 70 | 14.0 | −100 | 2 | 91.20 | 65.0 | 71.3 |
| 130 | 26 | 70 | 14.0 | −100 | 4 | 91.20 | 71.8 | 78.7 |
| 131 | 24 | 70 | 14.0 | −100 | 6 | 91.20 | 76.9 | 84.3 |
| 132 | 22 | 70 | 14.0 | −100 | 8 | 9.120 | 79.4 | 87.1 |
| 133 | 20 | 70 | 14.0 | −100 | 10 | 91.20 | 85.2 | 93.4 |
| 134 | 28 | 70 | 14.0 | −400 | 2 | 91.20 | 68.6 | 75.2 |
| 135 | 26 | 70 | 14.0 | −400 | 4 | 91.20 | 74.7 | 81.9 |
| 136 | 24 | 70 | 14.0 | −400 | 6 | 91.20 | 76.9 | 84.3 |
| 137 | 22 | 70 | 14.0 | −400 | 8 | 91.20 | 82.6 | 90.6 |
| 138 | 20 | 70 | 14.0 | −400 | 10 | 91.20 | 84.1 | 92.2 |
| 139 | 28 | 70 | 14.0 | −600 | 2 | 91.20 | 65.1 | 71.4 |

TABLE 9-continued

| Sheet No. | UNREFINED WOOD PULP (+700 C.S.F.) Weight Percent | PARTICULATE (215 D.E.) Weight Percent | CHARGE MODIFIER (130-M SILICA COLLOID) Weight Percent | REFINED WOOD PULP Type (C.S.F.) | REFINED WOOD PULP Weight Percent | CALC. TOTAL Weight (Grams) | ACTUAL SHEET Weight (Grams) | SOLIDS RETENTION Percent |
|---|---|---|---|---|---|---|---|---|
| 140 | 26 | 70 | 14.0 | −600 | 4 | 91.20 | 77.8 | 85.3 |
| 141 | 24 | 70 | 14.0 | −600 | 6 | 91.20 | 80.9 | 88.7 |
| 142 | 22 | 70 | 14.0 | −600 | 8 | 91.20 | 84.3 | 92.4 |
| 143 | 20 | 70 | 14.0 | −600 | 10 | 91.20 | 84.4 | 92.6 |

In the manner described in Example 1, selected sheet samples were subjected to filtration and oil flow tests, with the following results:

TABLE 10

| Sheet Number | Membrane Protection (Minutes) | Differential Pressure Drop increase (psid) Across Filter Media | Differential Pressure Drop increase (psid) Across Membrane | Oil Flow |
|---|---|---|---|---|
| 119 | 32.0 | 0 | 10.0 | 89 |
| 123 | 12.5 | 0 | 10.0 | 365 |
| 143 | 32.0 | 10.0 | 0.4 | 7.0 |

EXAMPLE VI

A dispersion of −600 ml. refined pulp without unrefined pulp was prepared by the techniques described in Example 1, and one percent (based on the bone dry pulp weight) of the high molecular weight polyamide-epichlorohydrin resin, Hercules Polycup 1884, was added to the refined pulp dispersion with agitation. The slurry was then vacuum felted, in the manner described previously in Example 1, to form a sheet, which was subsequently dried to constant weight. The loss of the refined pulp through the screen during the sheet formation process was found to be 34.7 percent by weight. The resulting sheet was a thin, dense, impermeable structure and filtration and oil flow tests could not be performed.

Filter media sheets in accordance with the invention may be employed alone or in combination with other such media to treat pharmaceuticals such as antibiotics, saline solutions, dextrose solutions, vaccines, blood plasma, serums, sterile water or eye washes; beverages, such as cordials, gin, vodka, beer, scotch, whisky, sweet and dry wines, champagne or brandy; cosmetics such as mouthwash, perfume, shampoo, hair tonic, face cream or shaving lotion; food products such as vinegar, vegetable oils, extracts, syrups, fruit juices, make-up water or cooking oils; chemicals such as antiseptics, insecticides, photographic solutions, electroplating solutions, cleaning compounds, solvent purification and lubricating oils; and the like for retention of submicronic particles, removal of bacterial contaminants and resolution of colloidal hazes.

What is claimed is:

1. A method for the manufacture of microporous filter sheet of uniform porosity for the removal of submicron contaminants from liquids comprising at least 50% by weight of fine particulate distributed within an interfelted matrix of cellulose fibers, the method comprising:

providing a cationically disperse aqueous slurry mixture, comprising:

(a) an unrefined cellulose pulp having a Canadian Standard Freeness of +400 to +800 ml;

(b) a highly refined cellulose pulp having a Canadian Standard Freeness of from +100 to about −1000 ml, the weight ratio of said unrefined pulp to said highly refined pulp being from 2:1 to about 10:1; and (c) fine particulate, constituting at least 50% by weight of the total solids; and forming said slurry into said microporous filter sheet by vacuum felting, and drying.

2. The method of claim 1, wherein the fine particulate comprises up to about 70% by weight of total solids.

3. The method of claim 1, wherein said fine particulate comprises at least 50 percent by weight of diatomaceous earth.

4. The method of claim 1, wherein said fine particulate comprises an admixture of relatively coarse and relatively fine materials all of said materials having an average particulate dimension of less than 20 microns.

5. The method of claim 1, wherein said fine particulate comprises an admixture of diatomaceous earth and perlite.

6. The method of claim 1, wherein said highly refined pulp comprises from about 1 to about 10 percent by weight of the filter.

7. The method of claim 1, wherein the weight ratio of unrefined to highly refined pulp is from about 5:1 to 10:1.

8. The method of claim 7, wherein said fine particulate exhibits an average particulate dimension of less than about 10 microns.

9. A filter sheet manufactured according to the process of claim 1.

10. A microporous filter sheet of uniform porosity for the removal of submicron contaminants from liquids which comprises at least about 50 weight percent of fine particulate distributed within an interfelted matrix of cellulose fibers, said cellulose fibers being prepared from a cellulose pulp mixture comprising an unrefined cellulose pulp having a Canadian Standard Freeness of from about +400 to about +800 ml., and a highly refined cellulose pulp having a Canadian Standard Freeness of from +100 to about −1000 ml., the weight ratio of unrefined pulp to highly refined pulp being from about 2:1 to about 10:1, said particulate and said pulp mixture being dispersed in a cationically disperse aqueous slurry mixture and formed into a microporous sheet by vacuum-felting.

11. The filter of claim 10, wherein the surfaces of the fine particulate and the cellulose pulps possess a positive zeta potential.

12. A method for the filtration of submicron contaminants from liquids comprising passing the contaminated liquid through the filter of claim 10.

* * * * *